United States Patent Office 3,513,286
Patented May 19, 1970

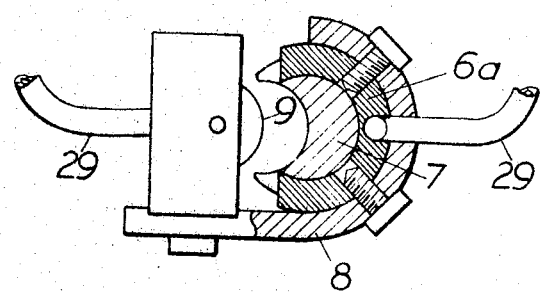
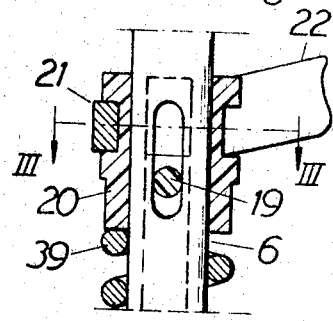
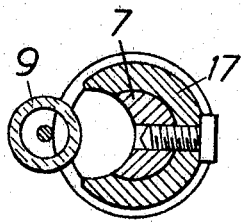
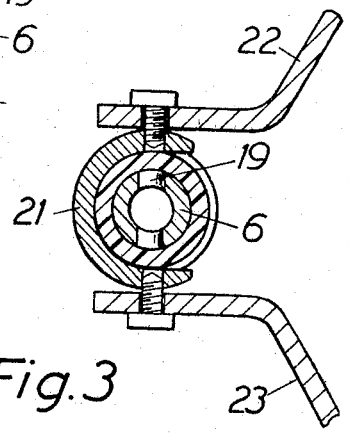

3,513,286
APPARATUS FOR WELDING TUBES
TO A TUBE PLATE
Jürgen Siegfried Puls, Laxa, Sweden, assignor to Elektriska Svetsningsaktiebolaget, Goteborg, Sweden, a corporation of Sweden
Filed Apr. 12, 1968, Ser. No. 720,944
Claims priority, application Sweden, July 7, 1967, 10,369/67
Int. Cl. B23k 9/12
U.S. Cl. 219—125               8 Claims

ABSTRACT OF THE DISCLOSURE

Apparatus for welding a circular joint between a tube and a tube plate, comprising a body or frame having a base provided with an electromagnet for attaching the body or frame to a magnetic supporting member, a welding head supported in said body by bearing means permitting the welding head to rotate about an axis extending at right angles to a plane defined by the pole faces of the electromagnet, a motor and gear means for rotating said welding head about said axis, a centering shaft guided in said body for movement along said axis, a centering member attached to the front extremity of said shaft, said centering member being adapted to engage the work so as to establish or check the required alignment of the axis of rotation of the welding head with the axis of the tube to be welded, spring means urging said centering shaft towards an inoperative position in which the centering member is remote from the work, a handle on said body, a control lever disposed beside said handle, and actuating means operatively connecting said control lever with said centering shaft so as on movement of said control lever towards said handle to shift said centering member from the inoperative position to an operative position in which the centering member engages the work.

---

This invention relates to welding, more particularly to the joining of tubes to a tube plate with the aid of apparatus provided with a welding head adapted to rotate about the axis of the tube to be welded. The welding head usually is provided with a nonconsumable electrode for arc welding in inert gas, with or without provision for the supply of a filler wire. It is, however, also possible to employ, for instance, a welding head adapted for consumable-electrode arc welding, particularly for the welding of thick-walled tubes.

Before the welding operation can be initiated the apparatus has to be carefully adjusted with regard to the work in such a way as to align the axis of rotation of the welding head with the axis of the tube to be welded. The alignment is established or checked with the aid of a centering member engaging the work. The centering member may be adapted to engage the inner or outer circumference of the tube to be welded or the inner circumference of the aperture in the tube plate. While in some existing apparatus the centering member is allowed to remain in engagement with the work during the welding operation, the invention is particularly concerned with apparatus in which the centering member is drawn back from the work before the welding operation is started.

As the number of tubes to be joined to a single tube plate is often large, for instance of the order of one thousand or more, it is important that the steps required for the positioning and adjusting of the welding apparatus prior to the starting of the welding operation can be carried out quickly and conveniently. The principal object of the invention is to provide apparatus which is particularly adapted to be placed in position and adjusted in a minimum of time and with a minimum of effort.

The invention principally resides in an apparatus for welding a circular joint between a tube and a tube plate, comprising a body or frame having a base provided with an electromagnet for attaching the body or frame to a magnetic supporting member, a welding head supported in said body by bearing means permitting the welding head to rotate about an axis extending at right angles to a plane defined by the pole faces of the electromagnet, a motor and gear means for rotating said welding head about said axis, a centering shaft guided in said body for movement along said axis, a centering member attached to the front extremity of said shaft, said centering member being adapted to engage the work in such a way as to establish or check the required alignment of the axis of rotation of the welding head with the axis of the tube to be welded, spring means urging said centering shaft towards an inoperative position in which the centering member is remote from the work, a handle on said body, a control lever disposed beside said handle, and actuating means operatively connecting said control lever with said centering shaft so as on movement of said control lever towards said handle to shift said centering shaft from the inoperative position to an operative position in which the centering member engages the work.

The invention also comprises new and improved means for controlling the energizing circuit of the electromagnet as well as new and improved means for initiating the welding operation, as will appear hereinafter.

One embodiment of the invention will now be described by way of example, with reference to the accompanying drawings, in which:

FIG. 1 shows a welding unit embodying the invention in elevation, some parts being shown in section, FIGS. 2 to 5 show details of the unit on a larger scale than FIG. 1, and FIG. 6 shows the unit together with a circuit diagram of the electrical apparatus.

More particularly,

FIG. 2 is a section taken on the line II—II of FIG. 1,

FIG. 3 shows the mechanical coupling between the centering shaft and the control lever in section taken on the line III—III of FIG. 1, FIG. 4 is a side elevation of said mechanical coupling, some parts being shown in section, and FIG. 5 is a section taken on the line V—V of FIG. 1.

Figure 1:
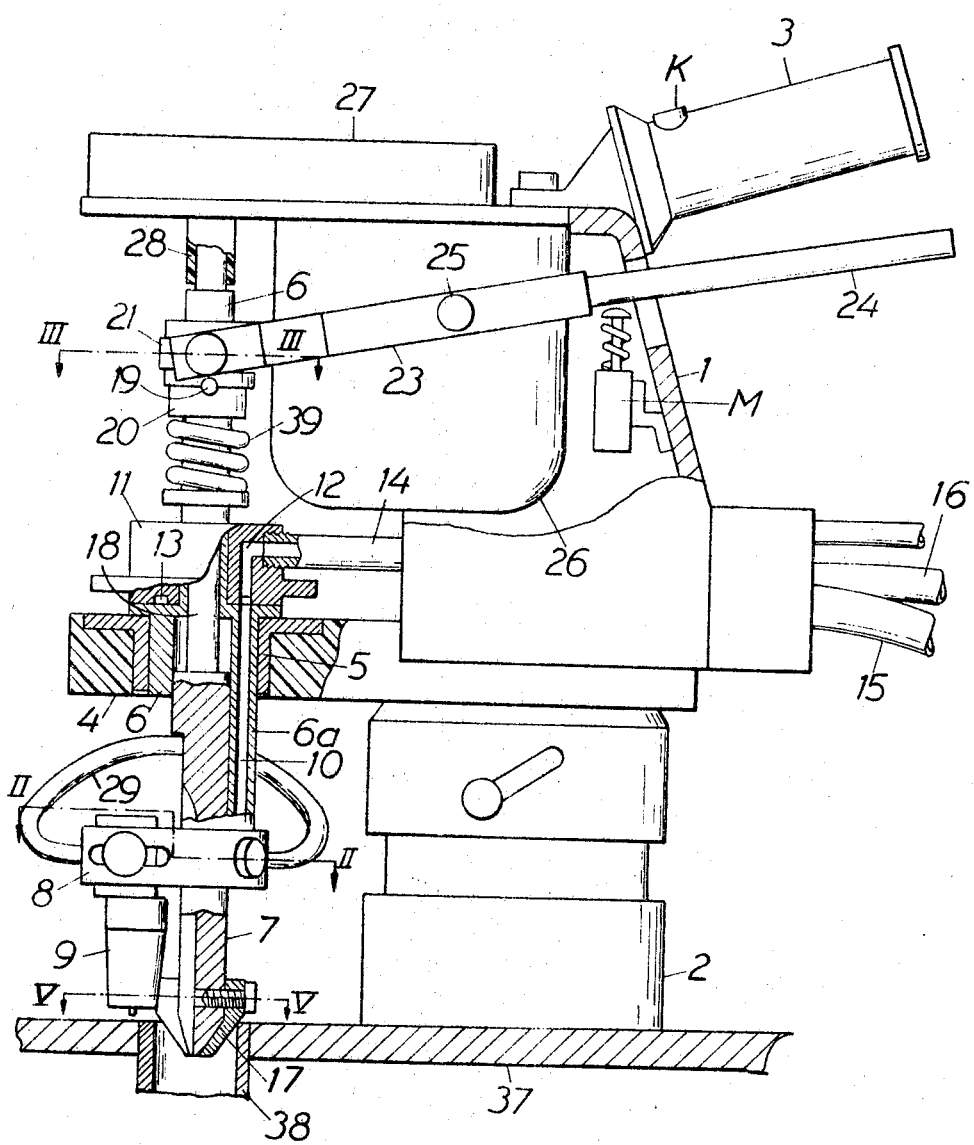

The unit shown has a body 1 provided with an electromagnet base 2 and a handle 3. An electrically insulated member 4 attached to the body 1 supports a bushing 5 serving as a bearing to a guide tube 6 for a centering shaft 7, said guide tube being rotatable in the bushing. A trough-shaped extension 6a of the guide tube 6 projecting downwards out of the bushing 5 supports a holder 8 in which a TIG welding torch or welding head 9 is adjustably secured. Welding current and shielding gas are supplied to the welding head through the extension 6a, the wall of which has a bore 10 connected at its lower extremity to the welding head by means of a piece of hose 29, the upper extremity of said bore communicating with an annular groove 13 in a contact member 11 engaging a shoulder on the guide tube 6. A channel 12 in said contact member connects the groove 13 with a tube 14 connected to a welding current cable 15 and a shielding gas conduit 16. The centering shaft 7 is fitted at its lower extremity with a conical centering piece 17. Said centering piece as well as the centering shaft itself are recessed on the side facing the welding head 9 in order to allow the welding torch 9 to be approached to the axis of rotation of the centering shaft to the extent required for the welding of annular joints having small radii. A pin 19 running in a pair of slits in the guide tube (FIG. 4) links the upper, thinner portion or stem 18 of the centering shaft to a sleeve 20 loosely engaging the guide tube 6, said sleeve 20 being provided on its outer circumference with an annular groove engaging a horseshoe-shaped actuator member 21 (FIGS. 3, 4) pivotally attached to a pair of prongs 22, 23 attached to a control lever 24 and pivoted at 25 to the housing 26 of a motor supported by the body 1. The motor is connected to a gear box 27 the drive axle of which is connected by an insulated bushing 28 to the upper end of the guide tube 6. The rotary motion thus imparted to the guide tube is transmitted by the pin 19 to the centering shaft 18, 7. A spiral spring 39 fitted between the sleeve 20 and a shoulder on the guide tube 6 urges the centering shaft towards its withdrawn (upper) position, said position being shown in FIG. 6. In this position, the lever 24 depresses the control pin of a switch M, causing said switch to close its normally open contact $m$. The handle 3 of the unit is provided with a control button K operating a normally open contact $k$.

Figure 6:
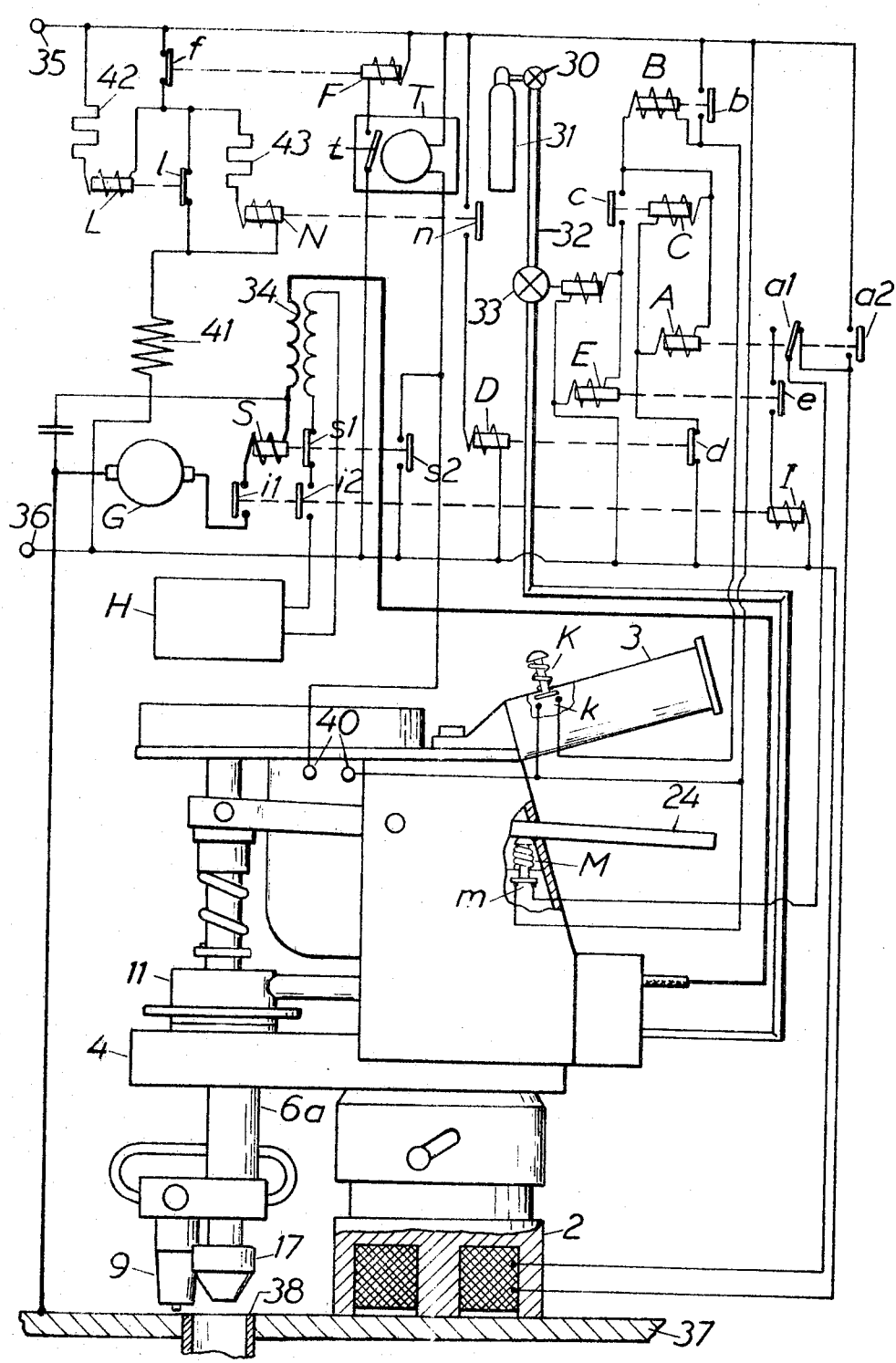

Welding power is provided by a DC generator G (FIG. 6). The welding circuit includes the normally open contact $i1$ of an ignition relay I. A shielding gas, for instance argon, is supplied to the unit from a gas bottle 31 through a reduction valve 30 and a gas conduit 32 provided with a solenoid valve 33. The welding circuit also includes the secondary of a transformer 34, the primary of which is connected to a source H of high-frequency current through a circuit including a normally open contact $i2$ of the ignition relay I and also including a normally closed contact $s1$ of a welding current relay S. A normally open contact $s2$ of the welding current relay S connects the motor of the unit, the terminals 40 of which are shown in FIG. 6, to an auxiliary voltage supplied to the terminals 35, 36 by a source of auxiliary voltage (not shown). The apparatus also comprises several other relays, the functions of which will be clear from the following description of the working of the apparatus.

It is assumed that the welding unit is to weld an annular joint between a tube sheet 37 of a magnetic material and a tube end 30 inserted in a hole in said tube sheet, and that the welding unit is placed on the tube sheet near the tube end, the centering member of the unit being in its withdrawn position (FIG. 6). The magnet base 2 is energized through a circuit from the terminal 35 through the contact $m$ of the switch M, the changeover contact $a1$ of the relay A in the normal position and the winding of the magnet base 2 to the clamp 36. Before welding can be started, the unit must be centered with regard to the tube end. The operator grasps the handle 3 and moves the control lever 24 upwards (towards the handle). The control pin of the switch M previously kept depressed by the lever 24 now returns to the normal position, in which the contact $m$ is open, so that the feed circuit of the magnet base 2 is deenergized. The operator now adjusts the position of the unit on the tube sheet so as to make the centering piece 17 properly engage the edge of the tube. As soon as this has been done, the operator depresses for a moment the button K on the handle. The contact K of said button closes a circuit from the terminal 35 through the contact $k$, the winding of the relay B, the windings of the relays A and C, said last-mentioned windings being connected in parallel with each other, and the normally closed contact $d$ of the stop relay D to the terminal 36. The relay B operates and closes its normally open contact $b$ connected in parallel to the contact $k$ of the button K. The relay B thus remains in the operated condition when the button $k$ is no longer operated. The relay A operates and moves its changeover contact $a1$ to the operated position and closes its normally open contact $a2$. The closing of the normally open contact $a2$ establishes a feed circuit for the magnet base 2 from the terminal 35 through the contact $a2$ and the winding of the magnet base 2 to the terminal 36. The magnet is energized and remains so until the welding operation has been concluded. The relay C operates, causing its normally open contact $c$ to close a circuit from the terminal 35 through contact $b$, the winding of relay B, contact $c$, the winding of the solenoid valve 33 and the winding of the relay E, said two last-mentioned windings being connected in parallel, to the terminal 36. The relay E operates, closing its normally open contact $e$. The solenoid valve admits shielding gas to the welding unit.

When the operator lets go of the control lever 24 (which he can do immediately after pushing the button K), the lever 24 returns to the position shown in FIG. 6 and operates the switch M, so that the contact $m$ closes a circuit from the terminal 35 through contact $m$, changeover contact $a1$ in the operated position, operated contact $e$ and the winding of the ignition relay I to the terminal 36. The ignition relay I operates, closing its normally open contacts $i1$, $i2$. The contact $i1$ connects the welding head 9 to the welding voltage of the generator G, while the contact $i2$ connects the high frequency current source H to the primary of the transformer 34. As soon as the arc starts, the resulting welding current excites the welding current relay S. The relay S operates, opening its normally closed contact $s1$ and closing its normally open contact $s2$. The contact $s1$ disconnects the primary of the transformer 34 from the high frequency current source H, while the contact $s2$ closes a circuit from the terminal 35 through the winding of the time relay T and the contact $s2$ to the terminal 36 and also closes a circuit from terminal 35 through the motor winding connected between the terminals 40 and the contact $s2$ to the terminal 36. The motor starts and causes the welding head to move in a circular path at the proper speed. At the same time, the time relay T starts. The time relay is adjusted so as to close its contact $t$ after a predetermined period corresponding to one turn of the welding head. The closing of the contact $t$ causes the relay F to open its normally closed contact $f$, causing a resistor 42 in series with the winding of a delayed-operation relay L to be connected in series in the feed circuit of the exciting winding 41 of the welding generator G. The reduction of the excitation of the generator thus effected results in a stepping-down of the output voltage and the load current of the generator. After a period determined by the delay characteristics of the relay L, said relay operates its normally closed contact 1 resulting in the introduction into the exciting circuit of the generator of one more resistor 43 in series with the energizing winding of a delayed-operation relay N. The welding current is thus reduced by one additional step. The gradual decrease of the welding current has for its purpose to prevent such imperfections (end-of-bead craters, end-of-bead cracks) which might be caused through a sudden decrease of the welding current from the full value to zero. The operation of the relay N causes its normally open contact $n$ to close a circuit through the winding of the stop relay D. The stop relay D operates, causing its normally closed contact $d$ to open the energizing circuits of the relays B, C and A. The relay A drops out and restitutes the alternative energizing circuit of the magnet base 2 extending through the changeover contact $a1$ in its normal position and the contact $m$. The magnet base 2 thus remains in the energized state in spite of the opening of the circuit comprising the contact $a2$. At the same time, the return to the normal position of the changeover contact $a1$ opens the energizing circuit of the ignition relay I. The ignition relay I drops out, causing its normally open contact $i1$ to open the welding circuit.

The relay C has a delayed drop-out and drops out slightly later than the relay A. The normally open contact $c$ of the relay C breaks the energizing current of the solenoid valve 33, causing said valve to return to its normally closed position and thereby to stop the supply of shielding gas. The operator may now move the control lever 24 towards the handle 3 in order to open the energizing circuit of the magnet base, so that the unit can be shifted to the next joint to be welded and placed in a centered position with regard to said joint.

In the example described, the tube plate 37 consists of magnetic material. It is possible, however, to use the apparatus for the welding of tubes to a tube plate of non-magnetic material, for instance stainless steel, by using an auxiliary support plate covering part of the surface of the tube plate and affixed to the tube plate by suitable means such as expansible plugs.

What is claimed is:

1. An apparatus for welding a circular joint between a tube and a tube plate having a body having a base provided with an electro-magnet for attaching the body to a magnetic supporting member, a welding head supported in said body by bearing means permitting the welding head to rotate about an axis extending at right angles to a plane defined by the pole faces of the electromagnet, a motor and gear means for rotating said welding head about said axis, a centering shaft guided in said body for movement along said axis, a centering member attached to the front extremity of said shaft, said centering member being adapted to engage the work so as to establish or check the required alignment of the axis of rotation of the welding head with the axis of the tube to be welded, the improvement which comprises spring means normally urging said centering shaft towards an inoperative position in which the centering member is remote from the work, a handle on said body, a control lever disposed adjacent said handle and mounted for movement relative thereto, and actuating means operatively connecting said control lever with said centering shaft so that on movement of said control lever towards said handle the bias of said spring means is overcome thereby shifting said centering shaft from the inoperative position to its operative position.

2. Apparatus as claimed in claim 1 in which the handle is fitted with a manual switch comprising means to control circuit means for energizing the electromagnet.

3. Apparatus as claimed in claim 1 comprising a push-button operated make contact fitted in said handle, a first relay, an energizing circuit for said first relay including said contact, a make contact in said first relay, an energizing circuit for the electromagnet including said make contact, a second relay energizing circuit of which includes said pushbutton operated make contact, said second relay comprising a make contact connected in parallel with said pushbutton operated make contact, whereby both of said relays as well as the electromagnet remain in the energized state when the pushbutton returns to its normally open opsition.

4. Apparatus as claimed in claim 3 comprising an arc welding electrode fitted in said welding head, a source of welding power, a welding circuit including said electrode and said source of welding power, an ignition relay the energizing circuit of which contains a second make contact in said first relay in series with a manually operable make contact or switch, said ignition relay comprising a make contact connected in series in said welding circuit.

5. Apparatus as claimed in claim 4 in which the arc-welding electrode is a nonconsumable electrode, comprising a source of high-frequency current, a transformer having a secondary winding connected in series in said welding circuit and a primary winding connected to said source of high-frequency current in series with a second make contact of said ignition relay.

6. Apparatus as claimed in claim 4 in which said manually operable make contact or switch has an actuating member comprising means to be operated through said control lever in the nonoperated position of said control lever, whereby the ignition relay is energized as soon as the centering shaft is allowed to return to its inoperative position.

7. Apparatus as claimed in claim 6 comprising a relay connected in series with the welding circuit, a make contact in said relay, a time relay having an energizing circuit including said make contact, a stop relay, an auxiliary relay having a make contact connected in series in the energizing circuit of said stop relay, circuit means actuable by said time relay for controlling the energizing circuit of said auxiliary relay, a break contact in said stop relay connected in the energizing circuit of said first and second relays, said first relay including a changeover contact, said second make contact of said first relay forming part of said changeover contact, the break contact part of said changeover contact being connected in an energizing circuit for the electromagnet in series with said make contact operable through the control lever.

8. Apparatus as claimed in claim 1 in which means are provided for adjusting the radius of rotation of the welding head and in which the centering shaft and the centering member are adapted to share the rotation of the welding head and have a substantially circular cross-sectional shape modified at the side facing the welding head by a recess sufficient to accommodate at least part of the welding head.

References Cited

UNITED STATES PATENTS

| | | | |
|---|---|---|---|
| 1,508,691 | 9/1924 | Glasser | 314—42 |
| 1,949,251 | 2/1934 | Gilbert | 219—125 |
| 2,583,665 | 1/1952 | Pilia | 219—127 |
| 2,719,209 | 9/1955 | Rebuffoni | 219—131 |
| 2,814,711 | 5/1960 | Shoup et al. | 219—98 |
| 3,100,833 | 8/1963 | Ritter et al. | 219—98 |
| 3,118,051 | 1/1964 | Dixon | 219—125 X |
| 3,355,570 | 11/1967 | Glorioso | 219—98 |

ANTHONY BARTIS, Primary Examiner

L. A. SCHUTZMAN, Assistant Examiner

U.S. Cl. X.R.

219—60